United States Patent
Covezzi et al.

(12)

(10) Patent No.: US 6,228,956 B1
(45) Date of Patent: *May 8, 2001

(54) PROCESS FOR THE GAS-PHASE POLYMERIZATION OF OLEFINS

(75) Inventors: Massimo Covezzi; Paolo Galli; Gabriele Govoni, all of Ferrara; Roberto Rinaldi, Mantova, all of (IT)

(73) Assignee: Montell Technology Company BV (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/476,063

(22) Filed: Jun. 7, 1995

Related U.S. Application Data

(63) Continuation of application No. 08/376,071, filed on Jan. 20, 1995, now abandoned, which is a continuation of application No. 07/983,633, filed on Dec. 1, 1992, now abandoned, which is a continuation-in-part of application No. 07/710,069, filed on Jun. 4, 1991, now abandoned.

(30) Foreign Application Priority Data

Jun. 3, 1991 (IT) .................................... RM91A0379

(51) Int. Cl.[7] .................. C08F 4/44; C08F 2/34
(52) U.S. Cl. .................. 526/65; 526/124.2; 526/124.3; 526/124.9; 526/125.3; 526/351
(58) Field of Search .................. 526/125.3, 125, 526/124.2, 124.3, 124.9, 65

(56) References Cited

U.S. PATENT DOCUMENTS

| | | | |
|---|---|---|---|
| 4,316,966 | 2/1982 | Mineshima et al. | 525/53 |
| 4,338,424 | 7/1982 | Morita et al. | 526/65 |
| 4,525,547 | 6/1985 | Kato et al. | 526/901 |
| 4,703,094 | 10/1987 | Raufart | 526/901 |
| 4,952,649 | 8/1990 | Kioka et al. | 526/351 |
| 4,960,741 | * 10/1990 | Bailly et al. | 526/351 |
| 4,971,937 | 11/1990 | Albizzati et al. | 526/125 |
| 4,990,477 | * 2/1991 | Kioka et al. | 526/906 |
| 5,087,522 | 2/1992 | Baily et al. | 526/901 |
| 5,153,158 | 10/1992 | Kioka et al. | 502/125 |
| 5,416,178 | * 5/1995 | Winter et al. | 526/351 |

FOREIGN PATENT DOCUMENTS

| | | |
|---|---|---|
| 099 774 | 2/1984 | (EP) . |
| 0 120 503 | 10/1984 | (EP) . |
| 0 338 676 | 10/1989 | (EP) . |
| 451645 | 10/1991 | (EP) . |
| 56034709 | 4/1981 | (JP) . |
| 3000706 | 1/1991 | (JP) . |
| WO 91/01338 | 2/1991 | (WO) . |

OTHER PUBLICATIONS

Soga et al, Transition Metal Catalyzes Polymerization: Ziegler–Nalta and Metathesis Polymerization Cambridge University Press .N.Y, (1988) pp. 266–279.*

Derwent English Abstract of Japanese Application No. 3000706, Jan. 1991.

Derwent English Abstract of Japanese Application No. 56034709, Apr. 1981.

Abstract of JP 4089814, Mar. 1992.

Abstract of EP 099 774, Feb. 8, 1984.

* cited by examiner

*Primary Examiner*—David W. Wu
*Assistant Examiner*—R. Rabago
(74) *Attorney, Agent, or Firm*—Bryan Cave LLP; Maurice B. Stiefel

(57) ABSTRACT

Process for the gas-phase polymerization of olefins of the formula $CH_2=CHR$ where R is hydrogen or an alkyl or aryl radical with 1 to 8 carbon atoms carried out in one or more reactors having a fluidized or mechanically agitated bed, using a catalyst obtained by reaction of a titanium halide or haloalcoholate and optionally an electron-donor compound supported on an active Mg-dihalide with an Al-trialkyl compound and optionally an electron-donor compound, comprising the steps of:

a) contacting the catalyst components in the absence of polymerizable olefin or optionally in the presence of said olefin in an amount to from up to 3 g per g of solid catalyst component;

b) prepolymerizing propylene or mixtures of propylene with ethylene or an alpha-olefin to form a propylene polymer having an insolubility in xylene of at least 60% by weight, in an amount of from 5 g of polymer per g of solid catalyst component to 10% by weight of the final catalyst yield; and c) polymerizing one or more $CH_2=CHR$ olefins in the gas phase in the presence of the prepolymer-catalyst system obtained in b), while maintaining in the gas phase an alkane in a molar concentration with respect to the total gases of from 20 to 90%.

17 Claims, 1 Drawing Sheet

PROCESS FOR THE GAS-PHASE
POLYMERIZATION OF OLEFINS

CROSS-REFERENCE TO RELATED
APPLICATION

This is a continuation, of U.S. application Ser. No. 08/376,071, filed Jan. 20, 1995, now abandoned, which is a continuation of U.S. application Ser. No. 07/983,633, filed Dec. 1, 1992, now abandoned which was a CIP of U.S. Ser. No. 07/710,069, filed Jun. 4, 1991, now abandoned.

FIELD OF THE INVENTION

The present invention relates to a process for the gas-phase polymerization of olefins of the formula $CH_2=CHR$ in which R is hydrogen or an alkyl or aryl radical with 1 to 8 carbon atoms, which is carried out in one or more reactors having a fluidized or mechanically agitated bed, in the presence of a highly active catalyst comprising a titanium compound supported on active Mg-dihalide.

BACKGROUND INFORMATION

It is known to continuously polymerize one or more olefins, such as ethylene or propylene, in the gas phase in a reactor with a fluidized or mechanically stirred bed, in the presence of a catalyst based on a compound of a transition metal belonging to groups IV, V or VI of the Periodic Table of the Elements, in particular in the presence of a catalyst of the Ziegler Natta type or a catalyst based on chromium oxide.

The polymer particles are kept in the fluidized and/or stirred state in a gaseous reaction mixture containing the olefin(s). The catalyst is introduced continuously or intermittently into the reactor while the polymer constituting the fluidized or mechanically stirred bed is withdrawn from the reactor, also continuously or intermittently. The heat of the polymerization reaction is essentially removed by the gaseous reaction mixture which passes through heat transfer means before being recycled into the reactor. In addition, a liquid stream may be introduced into the gas-phase reactor to enhance heat removal.

When a process for the gas-phase polymerization of an alpha-olefin is carried out in the presence of catalysts of high activity, such as those formed of the product of the reaction of an Al-alkyl compound with a titanium compound supported on active Mg-dihalide, the problem of heat removal is increased due to the low capacity of heat exchange of the gaseous phase.

It has been observed that small variations in the course of the polymerization, resulting, for example, from slight fluctuations in the quality of the catalyst or the olefins used in the reaction, can cause changes in the behavior and the catalytic activity of the polymer particles and have a particularly adverse effect because the small variations can cause an unexpected increase in the amount of heat evolved by the reaction which cannot be removed sufficiently rapidly and efficiently by the gaseous reaction mixture passing through the bed. Hot spots in the bed, as well as agglomerates of molten polymer, can be formed.

When hot spots appear in the bed it is generally too late to prevent the formation of agglomerates. However, if the reaction conditions are corrected sufficiently early, as by lowering the polymerization temperature or pressure, or reducing the rate at which the catalyst is supplied to the reactor in order to avoid the adverse effect of unexpected superactivation, the amount and size of the agglomerates formed can be reduced to some degree. During this period, however, it will not be possible to avoid a drop in the rate of polymer production and a deterioration in the quality of the resulting polymer.

To avoid these disadvantages, the general polymerization conditions are usually chosen with a safety margin such that hot spots and agglomerates do not form. For example, catalysts with reduced activity are used. The application of such conditions, however, either results in a substantial decrease in production or in a deterioration of the quality of the polymer.

To attempt to remedy the above drawbacks, EP 359,444-A1 discloses the introduction into the polymerization reactor of a retarder such as a polymerization inhibitor or a catalyst poison capable of reducing the polymerization rate of the olefin. However, the use of the retarder adversely affects the quality and the properties of the polymer such as the melt index, the melt flow ratio, and/or the stereo regularity of the polymer, as well as decreasing the productivity of the process.

Moreover, in the gas-phase process there is formation of electrostatic charges. Therefore catalyst and resin particles tend to adhere to the reactor walls, as a result of the electrostatic forces. If the polymer remains in a reactive environment for a long time, excess temperature can result in particle fusion with the formation of sheets or layer of thin fused agglomerates in the granular product. There are numerous causes for the formation of electrostatic charges, including generation due to friction of dissimilar materials, limited static dissipation, introduction into the process of minute quantities of prostatic agents, excessive catalyst activities, etc. There is a strong correlation between sheeting and the presence of excessive electrostatic charges (either negative or positive). This is evidenced by sudden changes in electrostatic levels followed closely by deviation in temperature at the reactor wall. The temperature deviations indicate particle adhesion, which causes an insulating effect and poorer heat transfer from the bed temperature. As a result, there generally is disruption in the fluidization patterns, catalyst feed interruption can occur, as well as plugging at the product discharge system.

As discussed in U.S. Pat. No. 4,532,311, the art teaches various processes whereby electrostatic charges can be reduced or eliminated. Processes suitable for use in a fluidized bed include (1) the use of an additive to increase the conductivity of the particles, thus providing a path for electrical discharge, (2) installation of grounding devices in a fluidized bed, (3) ionization of gas or particles by electrical discharge to generate ions to neutralize electrostatic charges on the particles, and (4) the use of radioactive sources to produce radiation that will create ions to neutralize electrostatic charges on the particles. However, the application of such techniques to a commercial scale reactor using a fluidized bed usually is not feasible or practical.

In U.S. Pat. No. 4,803,251 a group of chemical additives is disclosed which generate either positive or negative charges in the reactor and which are fed to the reactor in an amount of a few ppm per part of the monomer in order to prevent the formation of undesired positive or negative charges,. The chemical additives include alcohols, oxygen, nitric oxide, and ketones. Also in this case, however, there is a resulting deterioration in the polymer quality as well as a decrease in the reactor productivity.

The above drawbacks are increased when a gas-phase polymerization process is carried out using a highly active catalyst intended to produce spherical polymers having attractive morphological characteristics (high bulk density, flowability, and mechanical resistance). In this case, only a substantially complete control of the polymerization process enables one to obtain polymer particles having the above desired characteristics. This is particularly true when the gas-phase process is used to produce ethylene polymers, wherein the high polymerization kinetics of ethylene exacerbates the problem.

See also EP 0,416,379-A2, which discloses a process for preparing thermoplastic olefin polymers wherein the polymerization is carried out in at least two reactors using a catalyst based on a titanium halide supported on active $MgCl_2$. Reference is made to the possible precontacting of the preformed catalyst with small amounts of an olefin prior to the main polymerization step which is carried out in the liquid or gaseous phase.

SUMMARY OF THE INVENTION

It has now been found that it is possible to carry out a gas-phase polymerization process in a smooth and reliable manner, overcoming or markedly reducing the above difficulties, without a sacrifice in specific productivity and/or a deterioration in polymer quality.

In particular, it has been found that it is possible to obtain ethylene and propylene polymers in the form of high bulk density flowable spherical particles using spheriform catalysts endowed of a high activity. (By "spheriform" we mean substantially spheroidal or spherical particles.)

The process of the invention therefore offers the possibility, particularly with respect to the use of superactive catalysts having a specific activity of from 10 to 100 Kg/hr of polymer per g of solid catalyst component and particle dimensions in the range of 30 to 150 μm, which catalysts cannot be used in other existing gas-phase processes, of obtaining spheriform polymers. Such spheriform polymers can be sold without the need of pelletization, which operation, as is known, is expensive in terms of energy consumption.

Further the possibility of carrying out the gas-phase polymerization process with high specific productivity allows for a remarkable reduction in reactor volume.

Another advantage offered by the present process results from the nature of the prepolymer used, because the start up of the gas-phase reactor does not need any "bed resin" or initial dispersing bed, as is usually done in gas-phase processes of the prior art.

The continuous process of the present invention comprises the following steps:

a) contacting the catalyst components in the absence of a polymerizable olefin of the formula $CH_2=CHR$, where R is hydrogen or an alkyl or aryl radical with 1 to 8 carbon atoms, or optionally in the presence of said olefin in an amount to form up to about 3 g of polymer per g of solid catalyst component to obtain a stereospecific catalyst capable of polymerizing propylene under the conditions of step b) to form a propylene polymer having an insolubility in xylene of at least 60% by weight;

b) prepolymerizing with the above catalyst, propylene or mixtures thereof with ethylene and/or other alpha-olefins of the formula $CH_2=CHR$ in which R is an alkyl radical with 1 to 8 carbon atoms such as butene-1, hexene, 4-methylpentene-1 to form a propylene polymer having an insolubility in xylene greater than 60%, preferably greater than 90%, in an amount of from about 5 g of polymer per g of solid catalyst component to 10% by weight of the final catalyst yield; and c) polymerizing one or more olefins of the formula $CH_2=CHR$, where R is hydrogen or an alkyl or aryl radical with 1 to 8 carbon atoms, in the gas phase in one or more reactors having a fluidized or mechanically agitated bed in the presence of the prepolymer-catalyst system formed in b) while circulating in the reactor an alkane having from 3 to 5 carbon atoms in a molar concentration in the gas phase of from 20 to 90% with respect to the total gases.

Surprisingly and unexpectedly, the preformimg of the catalyst, the prepolymerization treatment with the catalyst, and the presence of the alkane in the gas phase in the molar concentration as indicated above, permits close control of the gas-phase polymerization process, even under those conditions in which the prior art processes were unable to operate.

DETAILED DESCRIPTION

The precontacting step a) is carried out in the presence of a liquid inert hydrocarbon solvent such as, e.g., propane, n-hexane or n-heptane, at a temperature below about 60° C. and preferably from about 0° to 30° C. for a time period of from about 6 seconds to 60 minutes.

In step a) the catalyst components may be contacted in the absence of a polymerizable olefin of the formula $CH_2=CHR$, where R is hydrogen or an alkyl or aryl radical with 1 to 8 carbon atoms, or optionally in the presence of said olefin in an amount to form up to about 3 g of polymer per g of solid catalyst component to obtain a stereospecific catalyst capable of polymerizing propylene under the conditions of step b) to form a propylene polymer having an insolubility in xylene of at least 60% by weight.

The catalyst forming components used in step a) include:

1) A solid comprising a titanium compound containing at least one Ti-halogen bond supported on active Mg-dihalide. The solid also contains an electron donor compound (inside donor) when the catalyst in itself is not sufficiently stereospecific to produce in step b) propylene polymers with the xylene insolubility characteristics set forth in b). As is known in the art, the stereospecificity of catalysts supported on active Mg-dihalide is increased by the use of an inside donor. As a general rule, the inside donor is always used when the catalyst component is employed to prepare catalysts for the stereoregular polymerization of propylene, butene-1 and similar alpha-olefins in which a high stereospecificity is needed in order to obtain polymers with an Isotacticity Index higher than 90, preferably higher than 95.

2) An Al-alkyl compound;

3) An electron donor compound (outside donor) which may be the same or different from the one present in solid component 1). When the gas-phase process is used to produce stereoregular polymers, for instance, propylene polymers with a high isotacticity index, the outside donor is used to impart the catalyst the necessary high stereospecificity. However, when ethers of the type described in EP 0,344,755-A are used as the inside donor, the catalyst stereospecificity is in itself sufficiently high than no outside donor is needed. In the case of the polymerization of ethylene to produce HDPE (high density polyethylene), LLDPE (linear low density polyethylene) and similar polymers, an outside donor is used if the catalyst itself exhibits a stereospecificity insufficient to produce in step b) a propylene polymer with the xylene insolubility set forth therein.

The use in step b) of stereospecific catalysts allows one to obtain propylene polymers having, in addition to the insolubility in xylene indicated in b), a high intrinsic viscosity, i.e. greater than 1 dl/g, which high viscosity is important to impart to the prepolymer the desired morphological properties.

The catalyst formed in step a) is fed continuously or intermittently to step b).

Step b) can be carried out in the liquid or gas phase. Preferably it is carried out in the liquid phase, either using propylene itself as the liquid medium or using a hydrocarbon solvent such as n-hexane, n-heptane, cyclohexane or a low boiling alkane such as propane, butane (kept in the liquid state under the conditions used in b).

The polymerization of propylene in step b) is carried out at a temperature of from about 0° to 80° C., preferably from about 50 to 50° C. Propylene or mixtures of propylene with ethylene and/or other alpha-olefins such as butene-1, hexene-1,4-methylpentene-1, are polymerized to form polymers having an insolubility in xylene greater than 60%. The amount of the prepolymer formed ranges from about 5 g of polymer per g of solid catalyst component to 10% by weight of the final catalyst yield, and preferably is from 5 g per g to 3% by weight of the final catalyst yield. The final catalyst yield can be determined by the analysis of the catalyst residues, for instance, from the titanium and/or magnesium content or from the balance of the materials.

Step b) can be carried out continuously or intermittently. In the case of continuous operation and when the gas-phase process is run to produce ethylene polymers, an appropriate separator system of the unreacted propylene is provided before feeding the prepolymer-catalyst system of step b) to the gas-phase reactor.

When the process is used to produce HDPE with a broad MWD (molecular weight distribution), it may be convenient to remove the outside donor present before feeding the prepolymer-catalyst system to the gas-phase reactor.

The gas-phase polymerization of step c) is carried out according to known techniques, operating in one or more reactors in cascade having a fluidized or mechanically agitated bed. The process is carried out at a temperature below the sintering temperature of the polymer particles. Generally the temperature is from about 50° to 120° C., and more preferably from about 70° to 100° C.

The total pressure is between 1,5 and 3 MPa. As previously indicated, the gaseous phase present in the reactor(s) contains an inert $C_3$–$C_5$ alkane in an amount of from 20 to 90% molar, preferably from 30 to 90% molar, with respect to the total gases. Suitable alkanes include propane, butane, isobutane, n-pentane, isopentane, cyclopropane, or cyclobutane. Preferably the alkane is propane.

The alkane is fed into the reactor either with the monomer or separately and is recycled with the recycle gas, i.e., the gas stream which does not react in the bed and which is removed from the polymerization zone, preferably by passing it into a velocity reduction zone above the bed where entrained particles are given an opportunity to drop back into the bed. The recycle gas is compressed and thereafter passed through a heat exchanger before it is returned to the bed. See, e.g., U.S. Pat. Nos. 3,298,792 and 4,518,750 for a description of gas-phase reactors and techniques.

It is surprising and completely unexpected that the alkanes are effective in providing the advantages as hereabove indicated, whereas the use of an inert gas like nitrogen is ineffective. Indeed, the use of nitrogen does not prevent the formation of large aggregates ("chunks"), with the consequent need to shut down the operation.

According to a preferred embodiment, the polymerization reaction is carried out in at least two reactors in cascade, in the first of which, where the initial amount of polymer is formed, the alkane concentration is maintained at a level higher than the concentration in the second (or subsequent reactors). Usually it is preferred that the alkane is circulated only in the first reactor wherein from about 5 to 60% of the total polymer is produced. Conversely, in cases such as the sequential polymerization of propylene to produce impact propylene copolymers by 1) homopolymerization of propylene and 2) copolymerization of mixtures of ethylene and propylene, it is desirable to operate the process using substantially the same alkane concentration in the various reactors.

In the reactors the fluidization is achieved by using a high rate of gas recycle to and through the bed, typically of the order of about 50 times the rate of feed of make-up gas. Make-up gas is fed to the bed at a rate equal to the rate at which particulate polymer product is withdrawn.

To insure complete fluidization, the recycle gas and, where desired, part or all of the make-up gas are returned to the reactor at a point below the bed. A gas distribution plate positioned above the point of return ensures proper gas distribution and also supports the resin bed when gas flow is stopped.

Hydrogen may be used as a chain transfer agent to regulate the polymer molecular weight.

BRIEF DESCRIPTION OF THE DRAWING

A typical simplified flow diagram of the process is given in accompanying FIG. 1. Reference numeral 1 indicates the pre-contacting vessel. The loop reactor 2 is the prepolymerizer. The gas-phase reactors are designated by 4 and 6, and the solid/gas separators are designated by 3, 5 and 7.

The catalyst components and diluent (propane) are fed to vessel 1 as indicated by arrows A. The formed catalyst is fed to loop reactor 2 as indicated by arrow B. Propylene is fed to the loop reactor as indicated by arrow E. The catalyst-prepolymer product is passed to separator 3, and then to the gas-phase reactor 4, wherein the monomer, hydrogen and propane are fed, as indicated by arrow C, to the recycle-gas line. The polymer leaving reactor 4, after passing through the separator 5, is introduced into the reactor 6, wherein the monomer, hydrogen and propane are fed as indicated by arrow D. The particulate polymer product is withdrawn from reactor 6 and fed to separator 7.

Figure 1:
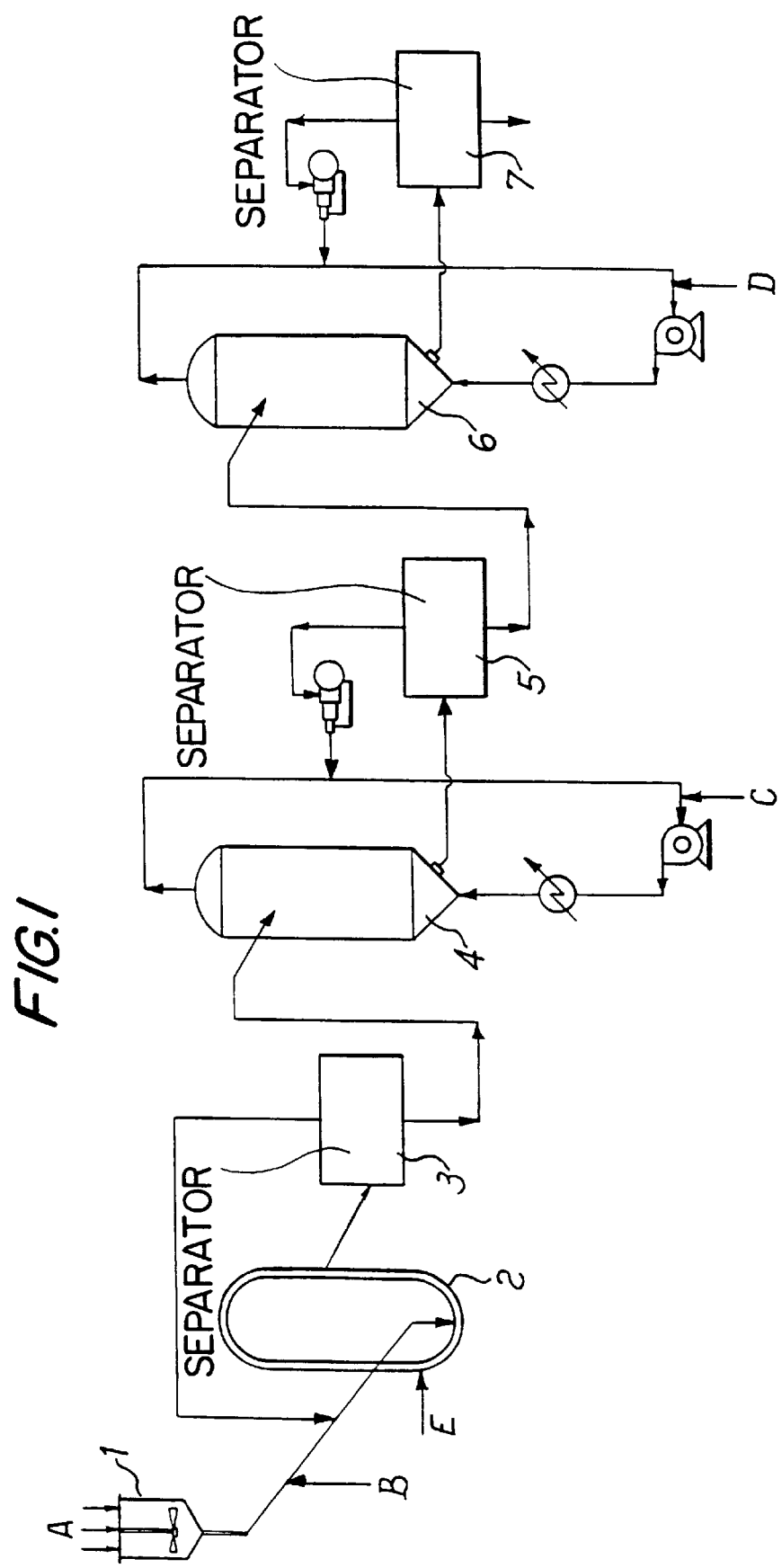

The recycle-gas stream of both reactors is compressed and cooled to remove the heat of reaction while avoiding condensation of the gaseous components, before it is returned to the gas-phase reactor. A minor portion of the recycle-gas stream for reactor 4 is cooled to separate as a liquid phase the propane, together with any monomer condensing under the same conditions as the propane. The separated liquid phase is then returned to the prepolymerizer 2. More than one condensing step can be used when the introduction of a heavy comonomer in the prepolymerizer is not desired. In this case, the heavy comonomer is condensed and removed from the recycle-gas stream before condensing the propane.

The active Mg-dihalides used as support for Ziegler-Natta catalysts are described extensively in the patent literature. U.S. Pat. Nos. 4,298,718 and 4,495,338 described for the first time the use of said supports.

The Mg-dihalides forming the support of the catalyst components used in the process of the present invention are characterized by X-ray spectra wherein the most intense line which appears in the spectrum of the non-active halide is no longer present, but is substituted by a halo with the maximum intensity shifted towards lower angles with respect to the angle of the most intense line, or this line is still present but it appears broadened.

The titanium compounds suitable for the preparation of the solid catalyst component include the Ti-halides such as TiCl$_4$, which is the most preferred, TiCl$_3$, and haloalcoholates such as trichlorophenoxy titanium and trichlorobutoxy titanium.

The titanium compound can be used in mixtures with other transition metal compounds such as vanadium, zirconium and hafnium halides and haloalcoholates.

Suitable inside electron-donors comprise ethers, esters, amines, ketones and diethers of the general formula:

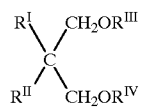

wherein $R^I$ and $R^{II}$ are the same or different from each other and may be alkyl, cycloalkyl and aryl radicals with 1 to 18 carbon atoms, and $R^{III}$ and $R^{IV}$ are the same or different and are alkyl radicals with from 1 to 4 carbon atoms. Preferred are the alkyl, cycloalkyl and aryl esters of polycarboxylic acids such as phthalic and maleic acid, and diethers of the formula:

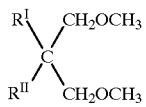

in which $R^I$ and $R^{II}$ are as above defined. Examples of said compounds include di-n-butyl-phthalate, di-isobutyl-phthalate, di-n-octyl-phthalate, 2-methyl-2-isopropyl-1,3-dimethoxypropane, 2-methyl-2-isobutyl-1,3-dimethoxypropane, 2,2-diisobutyl-1,3-dimethoxypropane, 2-isopropyl-2-isopenthyl-1,3-dimethoxypropane.

The inside donor is generally present in molar ratios with respect to the Mg of from 1:8 to 1:14. The titanium compound, espressed as Ti, is present in an amount of from 0.5 to 10% by weight.

Solid catalyst components can be prepared according to the disclosures of U.S. Pat. Nos. 4,748,221 and 4,803,251. If the stereospecificity of the resulting catalyst is not sufficiently high for the purposes of this invention, it can be readily modified according to well known techniques as previously indicated.

Using catalysts obtained from the catalyst components described in EP 0,344,755-A it is possible to prepare spheriform polymers with an average diameter between 300 and 5000 microns, and in the case of ethylene and propylene polymers, a bulk density higher than 0.45 g/cc.

The Al-alkyl compound used as the co-catalyst to prepare the catalyst in step a) may be an Al-trialkyl such as, e.g., Al-triethyl, Al-triisobutyl, Al-tri-n-butyl, Al-tri-n-octyl. Mixtures of Al-trialkyls with Al-alkyl halides or Al-alkyl-sesquihalides such as AlEt$_2$Cl and Al$_2$Et$_3$Cl$_3$ may also be used. The Al/Ti ratio in the catalyst formed in a) is greater than 1 and generally is between 20 and 800.

The outside donor may be the same or different from the electron-donor present as the inside donor.

When the inside donor is an ester of a polycarboxylic acid, especially a phthalate, the outside donor is a silicon compound of the formula $R_1R_2Si(OR)_2$, where $R_1$ and $R_2$ are alkyl, cycloalkyl or aryl radicals with 1 to 18 carbon atoms. Examples of such silanes are methylcyclohexyldimethoxy silane, diphenyldimethoxy silane and methyl-t-butyldimethoxy silane.

The solubility in xylene of the propylene polymer formed in step b) is determined by dissolving 2 g of polymer in 250 ml of xylene at 135° C. while agitating. After 20 minutes the solution is left to cool until it reaches 25° C. After 30 minutes the precipitate material is filtered, the solution is evaporated in nitrogen gas, and the residue is dried under vacuum at 80° C. Thus, the percentage of polymer soluble in xylene at room temperature and therefore also the insoluble percentage, are calculated.

As previously indicated, the process of this invention makes it possible to obtain a large number of different grades of olefin polymers, for example, high density polyethylenes (HDPE; density greater than 0.940 g/cc), including homopolymers of ethylene and copolymers of ethylene with alpha-olefins having from 3 to 12 carbon atoms; linear low density polyethylenes (LLDPE; density less than 0.940 g/cc); and very low and ultra low density linear polyethylenes (VLDPE and ULDPE; density less than 0.920 g/cc and as low as 0.880 g/cc) consisting of copolymers of ethylene and one or more alpha-olefins having from 3 to 12 carbon atoms, with a content of units deriving from ethylene of over 80% by weight; elastomeric terpolymers of ethylene, propylene and dienes, and elastomeric copolymers of ethylene and propylene, having a content of units derived from ethylene comprised between about 30 and 70% by weight; isotactic polypropylenes and crystalline copolymers of propylene and ethylene and/or other alpha-olefins, having a content of units derived from propylene of over 85% by weight; impact polymers of propylene obtained by sequential polymerization of propylene and mixtures of propylene with ethylene, containing up to 30% by weight of ethylene; copolymers of propylene and butene-1 having a content of units derived from butene-1 comprised between 10 and 40% by weight.

As previously pointed out, the process is particularly suitable for the production of ethylene polymers wherein the high polymerization kinetic of ethylene requires a close control of the gas-phase process in order to avoid those difficulties typical of the prior art gas-phase processes, particularly when the process is carried out with high specific productivity.

As indicated, in the case of the polymerization of propylene or its mixtures with ethylene and/or other olefins of the formula CH$_2$=CHR to form stereoregular polymers, a highly stereospecific catalyst is needed. The highly stereospecific catalyst (capable of forming propylene homopolymers with an isotacticity index higher than 90) is preferably formed only in step b). If necessary the stereospecificity can be further modified by feeding proper quantities of an electron-donor compound into the polymerization reactor.

The following examples will further illustrate our invention. All parts are by weight unless otherwise indicated.
General Procedure The solid catalyst component used in the examples was prepared as follows:

Under an inert atmosphere, 28.4 g of MgCl$_2$, 49.5 g of anhydrous ethanol, 10 ml of ROL OB/30 vaseline oil, and 100 ml of silicone oil having a viscosity of 350 cs were introduced into a reaction vessel equipped with a stirrer and heated at 120° C. until the MgCl$_2$ is dissolved. The hot reaction mixture was then transferred to a 1,500 ml vessel equipped with a Ultra Turrax T-45 N stirrer and containing 150 ml of vaseline oil and 150 ml of silicone oil. The temperature was maintained at 120° C. with stirring for 3 minutes at 3,000 rpm. The mixture was then discharged into a 2 liter vessel equipped with a stirrer and containing 1,000 ml of anhydrous n-heptane cooled at 0° C. and stirred at a speed of 6 m/s for about 20 minutes while maintaining the temperature 0° C. The particles thus formed were recovered by filtering, washed with 500 ml aliquots of n-hexane and heated gradually by increasing the temperature from 50° C. to 100° C. for a period of time sufficient to reduce the alcohol content from 3 mole to the moles indicated in the various examples.

The adduct (25 g), containing the various alcohol contents indicated in the examples, was transferred into a reaction vessel equipped with a stirrer and containing 625 ml of TiCl$_4$ at 0° C. under agitation. It was then heated to 100° C. in one hour. When the temperature reached 40° C., diisobutylphthalate was added in an amount such that the molar ratio of Mg to the phthalate was 8. The contents of the vessel were then heated at 100° C. for two hours with agitation and then the solid was allowed to settle. The hot liquid was removed by siphon. 500 ml of TiCl$_4$ were added and the mixture was heated at 120° C. for one hour with agitation. The agitation was stopped and the solid was allowed to settle. The hot liquid was removed by siphon. The solid was washed with aliquots of n-hexane at 60° C. and then at room temperature.

EXAMPLE 1

A pilot plant operated continuously was used to prepare LLDPE. The plant comprised a reactor vessel in which the catalyst-forming components were mixed to form the catalyst, a loop reactor receiving the catalyst formed in the previous stage and in which liquid propylene and propane were fed, and two fluidized-bed reactors connected in series, the first of which received the prepolymer formed in the previous stage and discharged the polymer in the second reactor. These reactors were of the type described in U.S. Pat. No. 4,518,750.

The run was carried out by feeding a solid catalyst component prepared according to the general procedure hereabove set forth using a MgCl$_2$/ethanol adduct containing 35% by weight of alcohol, a n-hexane solution of Al-triethyl (TEAL) and methylcyclohexyldimethoxy silane electron-donor in an amount such that the weight ratio of TEAL to silane was 4 and the molar ratio TEAL/Ti was 120, into the pre-contacting vessel, which was kept at a constant temperature of 5° C. To this vessel propane was also fed as an inert polymerization medium. The residence time was about 15 minutes.

The product discharged from the vessel was fed into a loop prepolymerizer kept at a constant temperature of 27° C. The residence time in the loop reactor was about 140 minutes. Due to both the low amount of propylene fed and the high conversion, the liquid propylene was almost completely converted into solid polymer (with a yield, referred to the solid catalyst component, of about 100 g/g solid component). The quantity of propylene entering the gas phase reactor was, therefore, negligible.

The first reactor, which received the prepolymer produced in the previous step, ran at a temperature of 80° C. and the reaction pressure was kept at 2 MPa. The average residence time of the growing polymer inside the reactor was about 80 minutes.

The reaction monomers and the gas fed into the reactors were the following:

ethylene and butene;

hydrogen as molecular weight regulator;

propane.

The run conditions are reported in Table 1.

EXAMPLE 2

HDPE was prepared using the plant arrangement described in Example 1.

The run was carried out by feeding the catalyst components into the pre-contacting vessel which was kept at a constant temperature of 20° C.

TABLE 1

| | | |
|---|---|---|
| PRECONTACT STAGE | | |
| temperature | (° C.) | = 5 |
| residence time | (min) | = 15 |
| PREPOLYMERIZATION STAGE | | |
| temperature | (° C.) | = 27 |
| residence time | (min) | = 140 |
| FIRST GAS PHASE REACTOR | | |
| temperature | (° C.) | = 80 |
| pressure | (MPa) | = 2.0 |
| residence time | (min) | = 80 |
| ethylene | (% mol) | = 32.13(**) |
| hydrogen | (% mol) | = 9.46(**) |
| butene | (% mol) | = 6.43(**) |
| propane | (% mol) | = 47.50(**) |
| SECOND GAS PHASE REACTOR | | |
| temperature | (° C.) | = 80 |
| pressure | (MPa) | = 1.5 |
| residence time | (min) | = 60 |
| ethylene | (% mol) | = 52.00(**) |
| hydrogen | (% mol) | = 15.60(**) |
| butene | (% mol) | = 11.33(**) |
| propane | (% mol) | = 13.50(**) |
| FINAL PRODUCT CHARACTERISTICS | | |
| real density (on pellets) | (Kg/l) | = 0.9181 |
| melt index E (on pellets) | (g/10 min) | = 0.84 |
| poured bulk density | (Kg/l) | = 0.351 |
| tamped bulk density | (Kg/l) | = 0.388 |
| particle size: d > 2,000 μm | (% wt) | = 53.7(*) |
| d > 1,000 μm | (% wt) | = 42.5(*) |
| d > 500 μm | (% wt) | = 3.6(*) |
| d < 500 μm | (% wt) | = 0.2(*) |
| final mileage (Kg PE/g solid catalyst component) | | = 33 |

(*)d means diameter of the spherical form product obtained.
(**)The balance to 100% being due to other inerts (ethane, butane, etc.) present in the monomers fed.

The product discharged from the vessel was fed to a loop prepolymerizer into which liquid propylene and propane (as inert medium) were fed.

The residence time in prepolymerization was about 82 minutes and the temperature was kept constant at 20° C. The fluid contained in this prepolymerization reactor was in a liquid state.

The liquid propylene was almost completely converted to solid polypropylene with a yield with respect to the solid catalyst component of about 400 grams of polypropylene per gram of catalyst component. The residual quantity of propylene discharged with the polymer from the prepolymerizer was flashed in order to have negligible quantities of propylene fed to the gas phase reactor.

The first reactor, which received the prepolymer produced in the previous step, ran at a temperature of 75° C. and the reactor pressure was kept at 1.8 MPa. The average residence time of the growing polymer inside the reactor was about 96 minutes.

The reaction monomers and the gas fed into the reactor were the following:
- ethylene;
- hydrogen as molecular weight regulator;
- propane.

The run conditions are reported in Table 2.

TABLE 2

| PRECONTACT STAGE | | |
|---|---|---|
| temperature | (° C.) | = 20 |
| residence time | (min) | = 15 |
| PREPOLYMERIZATION STAGE | | |
| temperature | (° C.) | = 20 |
| residence time | (min) | = 82 |
| FIRST GAS PHASE REACTOR | | |
| temperature | (° C.) | = 75 |
| pressure | (MPa) | = 1.8 |
| residence time | (min) | = 96 |
| ethylene | (% mol) | = 23(**) |
| hydrogen | (% mol) | = 29(**) |
| propane | (% mol) | = 40(**) |
| SECOND GAS PHASE REACTOR | | |
| temperature | (° C.) | = 80 |
| pressure | (MPa) | = 1.5 |
| residence time | (min) | = 83 |
| ethylene | (% mol) | = 23(**) |
| hydrogen | (% mol) | = 30(**) |
| propanne | (% mol) | = 37(**) |
| FINAL PRODUCT CHARACTERISTICS | | |
| real density (on pellets) | (Kg/l) | = 0.958 |
| melt index E (on pellets) | (g/10 min) | = 4.5 |
| poured bulk density | (Kg/l) | = 0.403 |
| tamped bulk density | (Kg/l) | = 0.450 |
| particle size: d > 2,000 μm | (% wt) | = 77.1(*) |
| d > 1,000 μm | (% wt) | = 22.2(*) |
| d > 500 μm | (% wt) | = 0.4(*) |
| d < 500 μm | (% wt) | = 0.3(*) |
| final mileage (Kg PE/g solid catalyst component) | | = 40 |

(*)d means diameter of the spherical form product obtained.
(**)The balance to 100% being due to other inerts (ethane, methane, etc.) present in the monomers fed.

EXAMPLE 3

The run was carried out by feeding a catalyst prepared according to Example 1, and batch prepolymerized with propylene directly into a single gas-phase reactor.

The temperature of the gas-phase reactor was 80° C. and the pressure was 2 MPa.

The gas components fed to the reactor were the following:
- ethylene and butene;
- hydrogen as molecular weight regulator;
- propane.

At the beginning, before feeding the prepolymerized catalyst to the gas-phase reactor, the propane concentration in the gas-phase was kept at about 60% molar. A smooth run was performed with the above indicated initial propane concentration.

Decreasing the initial propane concentration below 30% molar resulted in the formation of large aggregates due to the very high reactivity inside the gas-phase reactor.

The run conditions in the smooth test are reported in Table 3.

TABLE 3

| PREPOLYMERIZED CATALYST | | |
|---|---|---|
| mileage (Kg PP/g solid catalyst component) | | = 0.050 |
| FIRST GAS PHASE REACTOR | | |
| temperature | (° C.) | = 80 |
| pressure | (MPa) | = 2.0 |
| ethylene | (% mol) | = 52 (*) |
| hydrogen | (% mol) | = 7 (*) |
| butene | (% mol) | = 6.5 (*) |
| propane | (% mol) | = 32 (*) |

(*) The balance to 100% being due tb other inerts (ethane, butane, etc.) present in the monomers fed.

COMPARATIVE EXAMPLE 1

A test for producing linear low density polyethylene was carried out as follows:
- catalyst pre-contacting stage;
- gas-phase polymerization stage.

The prepolymerization step was omitted in order to investigate both the influence of this step in controlling the polymer morphology and process reliability.

The precontacting vessel was run at a temperature of 30° C. and the residence time was kept constant at 15 minutes.

The solid catalyst component (prepared according to the procedure of Example 1), the co-catalyst (TEAL), and the electron-donor (methylcyclohexyldimethoxy silane) were fed to the precontacting vessel with some added propane (as inert medium) which permitted one either to alter or to better control the residence time.

The discharged product was then fed to the first polymerization reactor which was kept at a constant temperature of 75° C. and the pressure was 1.8 MPa.

After about 30 minutes, the run had to be stopped because of the formation of some large aggregates (chunks) which disturbed the proper functioning of the system.

After degassing and purging, a check of the interior of the gas-phase reactor showed the presence of chunks and formation of large crusts on the walls of the gas-phase reactor.

Before shutdown, the gas-phase reactor gave the composition reported in the Table 4 (the run conditions of this trial are also reported):

TABLE 4

| PRECONTACT STAGE | | |
|---|---|---|
| temperature | (° C.) | 20 |
| residence time | (min) | 15 |
| FIRST GAS PHASE REACTOR | | |
| temperature | (° C.) | 75 |
| pressure | (MPa) | 1.8 |
| ethylene | (% mol) | 5(*) |
| hydrogen | (% mol) | 1.5(*) |
| butene | (% mol) | 0.5(*) |
| propane | (% mol) | 93(*) |

(*)These values refer to the initial composition in the gas-phase reactor.

EXAMPLE 4

The test was carried out by using the following plant arrangement:
- precontact stage;
- prepolymerization stage;
- gas-phase polymerization stage (the polymerization was performed by using two gas-phase reactors connected in series).

The run was carried out by precontacting a solid catalyst component, Al-triethyl and methylcyclohexyldimethoxy silane in the ratio used in Example 1 in the precontacting vessel, which was kept at a constant temperature of 40° C. The catalyst component was prepared from a MgCl$_2$ ethanol adduct containing 50% by weight of alcohol.

To this vessel propane was also fed, as inert reaction medium, and the resulting residence time was about 13 minutes.

The product discharged from the vessel was fed into a prepolymerizer into which propylene and propane (as inert medium) were also fed.

The residence time in prepolymerization was about two minutes and the temperature was kept constant at 20° C.

The fluid contained in this prepolymerization reactor was in a liquid state.

The gas-phase reactor section comprised two gas-phase reactors connected in series.

The first reactor, which received the prepolymer produced in the previous step, ran at a temperature of 80° C. and the reactor pressure was kept at 2.4 MPa.

The reaction monomers and the gas fed into the reactor were the following:

propylene;

hydrogen as molecular weight regulator;

propane.

The run conditions are reported in Table 5.

TABLE 5

PRECONTACT STAGE

| | | |
|---|---|---|
| temperature | (° C.) | = 40 |
| residence time | (min) | = 13 |
| PREPOLYMERIZATION STAGE | | |
| temperature | (° C.) | = 20 |
| residence time | (min) | = 2 |
| FIRST GAS PHASE REACTOR | | |
| temperature | (° C.) | = 80 |
| pressure | (MPa) | = 2.4 |
| residence time | (min) | = 54 |
| propylene | (% mol) | = 50.5(**) |
| hydrogen | (% mol) | = 6.4(**) |
| propane | (% mol) | = 41(**) |
| SECOND GAS PHASE REACTOR | | |
| temperature | (° C.) | = 80 |
| pressure | (MPa) | = 2.4 |
| residence time | (min) | = 66 |
| propylene | (% mol) | = 78.2(**) |
| hydrogen | (% mol) | = 10.4(**) |
| propane | (% mol) | = 5.5(**) |
| FINAL PRODUCT CHARACTERISTICS | | |
| poured bulk density | (Kg/l) | = 0.472 |
| tamped bulk density | (Kg/l) | = 0.528 |
| particle size:   d > 2,000 µm | (% wt) | = 21.9(*) |
| d > 1,000 µm | (% wt) | = 66.3(*) |
| d > 500 µm | (% wt) | = 10.2(*) |
| d < 509 µm | (% wt) | = 1.6(*) |
| final mileage | (Kg PP/g solid catalyst component) | = 21.2 |

(*)d means diameter of the spherical form product obtained.
(**)The balance to 100% being due to other inerts (methane, ethane, etc.) present in the monomers fed.

In all of the examples carried out in accordance with the present invention, the pilot plant ran smoothly with full control of all operating conditions.

Variations can of course be made without departing from the spirit of our invention.

We claim:

1. A continuous process for the gas-phase polymerization and copolymerization of an olefin of the formula CH$_2$=CHR, wherein R is hydrogen or an alkyl or aryl radical having from 1 to 8 carbon atoms, with a stereospecific catalyst comprising the product of reaction of the following catalyst components (1) a solid component comprising a Ti compound containing at least one Ti-halogen bond and an inside donor electron donor compound supported on an active Mg-dihalide, (2) an Al-alkyl compound, and (3) optionally an outside donor electron-donor compound to increase stereospecificity if the catalyst formed in step (a) below with components (1) and (2) alone is not sufficiently stereospecific to polymerize propylene under the conditions of step (b) below to form a propylene polymer having an insolubility in xylene of at least 60% by weight, said process comprising:

(a) contacting the catalyst components with one another in the absence of a polymerizable olefin of said formula, or optionally in the presence of an olefin of said formula, in an amount to form up to about 3 g of polymer per g of solid catalyst component, to obtain a stereospecific catalyst capable of polymerizing propylene under the conditions of step b) to form a propylene polymer having an insolubility in xylene of at least 60% by weight;

b) prepolymerizing propylene or mixtures of propylene with ethylene and/or an alpha-olefin having from 4 to 8 carbon atoms, in the presence of the stereospecific catalyst formed in step a), to form a propylene polymer having an insolubility in xylene of at least 60% by weight, in an amount of from about 5 g of polymer per g of solid catalyst component to 10% by weight of the final catalyst yield; and c) polymerizing one or more olefins of said formula, in the gas phase in at least two reactors, of which one reactor is a first reactor the at least two reactors having a fluidized or mechanically agitated bed and in the presence of the prepolymer-catalyst formed in step b), and said polymerization being carried out in the presence of an alkane having from 3 to 5 carbon atoms, incorporated in a molar concentration of from 20 to 90% of the total gas content in the polymerization mixture and wherein the concentration of alkane is higher in the first reactor than in the other reactors.

2. The process of claim 1, wherein the polymerization is carried out in two reactors, in the first of which from about 5 to 60% by weight of the total polymer is produced, and wherein the concentration of alkane is higher in the first reactor than in the second reactor.

3. The process of claim 1, wherein the catalyst prepared in step a) contains both an inside and an outside electron-donor compound.

4. The process of claim 3, wherein the inside donor is an ester of phthalic acid and the outside donor is a dimethoxydialkyl or alkylcycloalkyl silane.

5. The process of claim 4, wherein the catalyst has a specific activity of from 10 to 100 Kg per hour per gram of solid catalyst component.

6. The process of claim 4, wherein the alkane is propane.

7. The process of claim 4, wherein the olefin polymerized is propylene or a mixture thereof with ethylene and/or another alpha-olefin.

8. The process of claim 3, wherein the alkane is propane.

9. The process of claim 1, wherein the catalyst formed in a) contains as an inside donor a diether of the formula:

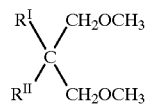

in which $R^I$ and $R^{II}$ may be the same or different and are alkyl, cycloalkyl or aryl radicals with 1 to 18 carbon atoms.

10. The process of claim 9, wherein the catalyst has a specific activity of from 10 to 100 Kg per hour per gram of solid catalyst component.

11. The process of claim 1, wherein the alkane is propane.

12. The process of claim 1, wherein the catalyst is obtained using an outside donor and a solid component containing an inside donor, and wherein the alkane is propane.

13. The process of claim 1, wherein the solid component has as an inside donor a diether of the formula:

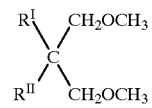

in which $R^I$ and $R^{II}$ may be the same or different and are alkyl, cycloalkyl or aryl radicals with 1 to 18 carbon atoms, and wherein the alkane used is propane.

14. The process of claim 1, wherein the olefin polymerized is propylene or a mixture thereof with ethylene and/or another alpha-olefin.

15. The process of claim 1, wherein the olefin of the formula $CH_2=CHR$ is ethylene or a mixture thereof with an alpha-olefin having from 4 to 8 carbon atoms.

16. The process of claim 1, wherein the precontacting step (a) is carried out at a temperature of from 0° C. to 30° C.

17. The process of claim 1, wherein the propylene polymer formed in the prepolymerizing step (b) has an insolubility in xylene of at least 90% by weight.

* * * * *